Oct. 17, 1950     L. G. GLESMANN     2,526,475
APPARATUS FOR ROLLING WEDGE SECTIONS
Filed March 29, 1945                             9 Sheets-Sheet 1

Inventor
Louis G. Glesmann,
By Emery Booth, Townsend Miller & Weidner
Attys

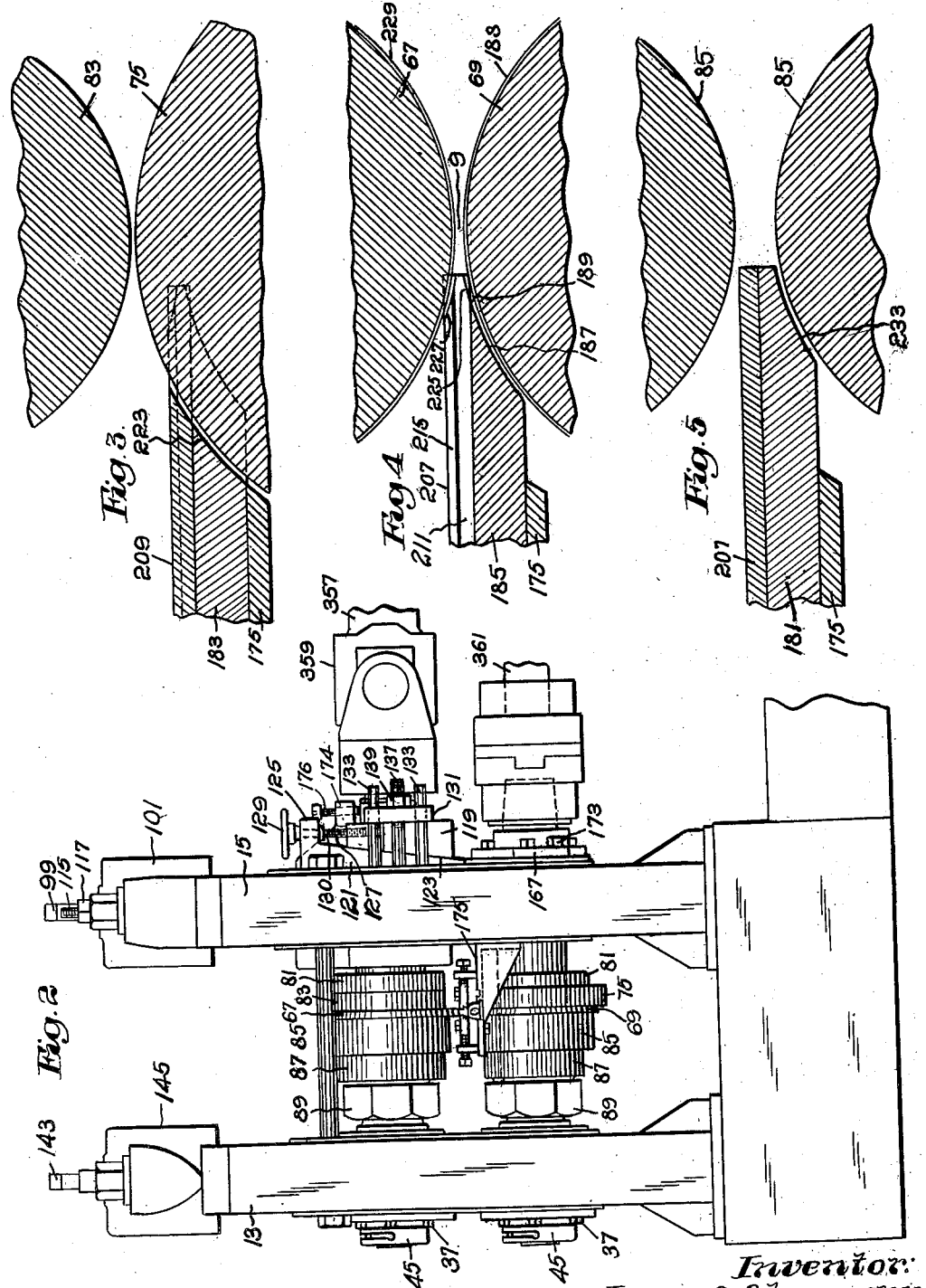

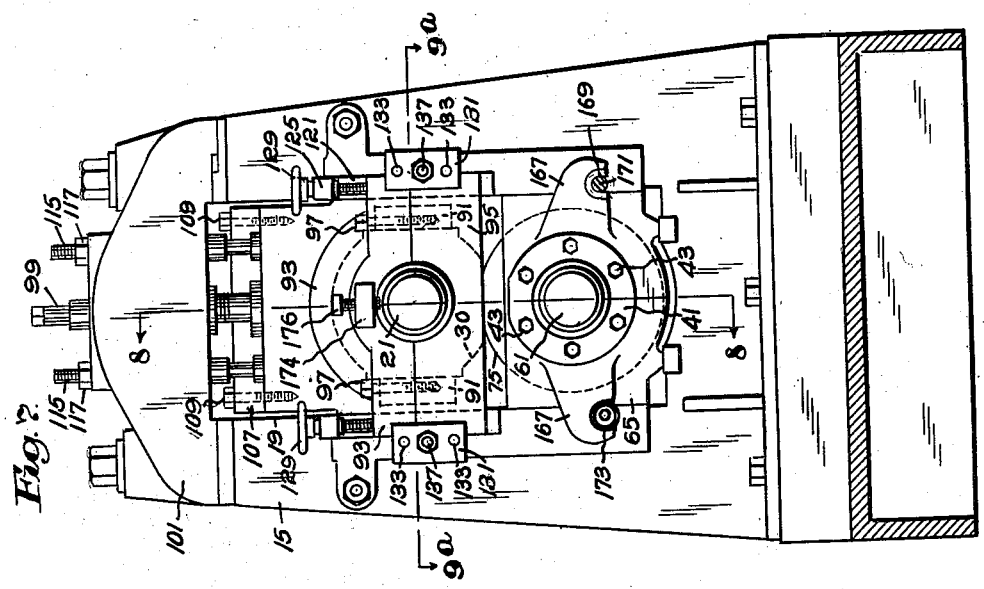
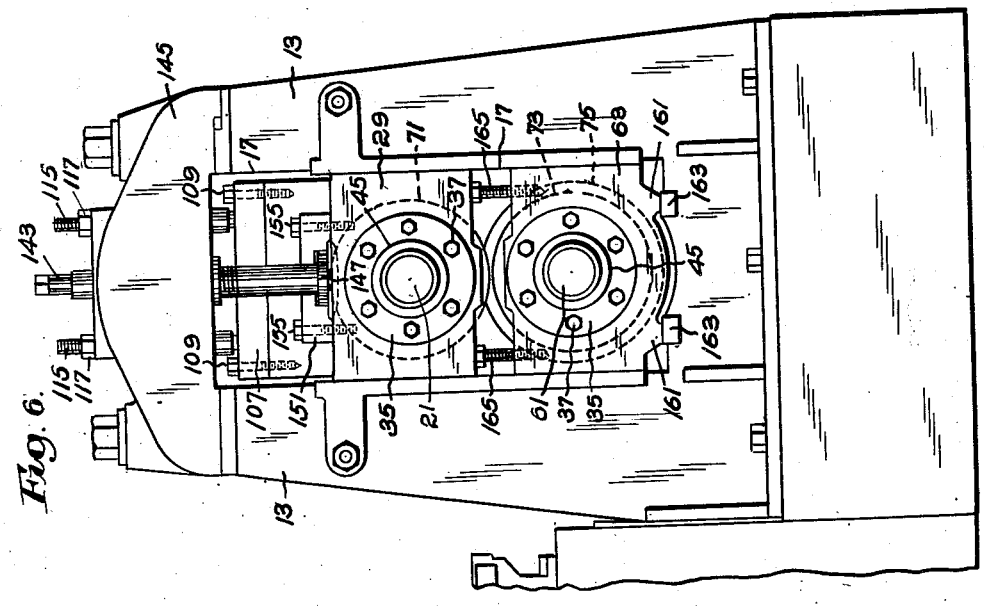

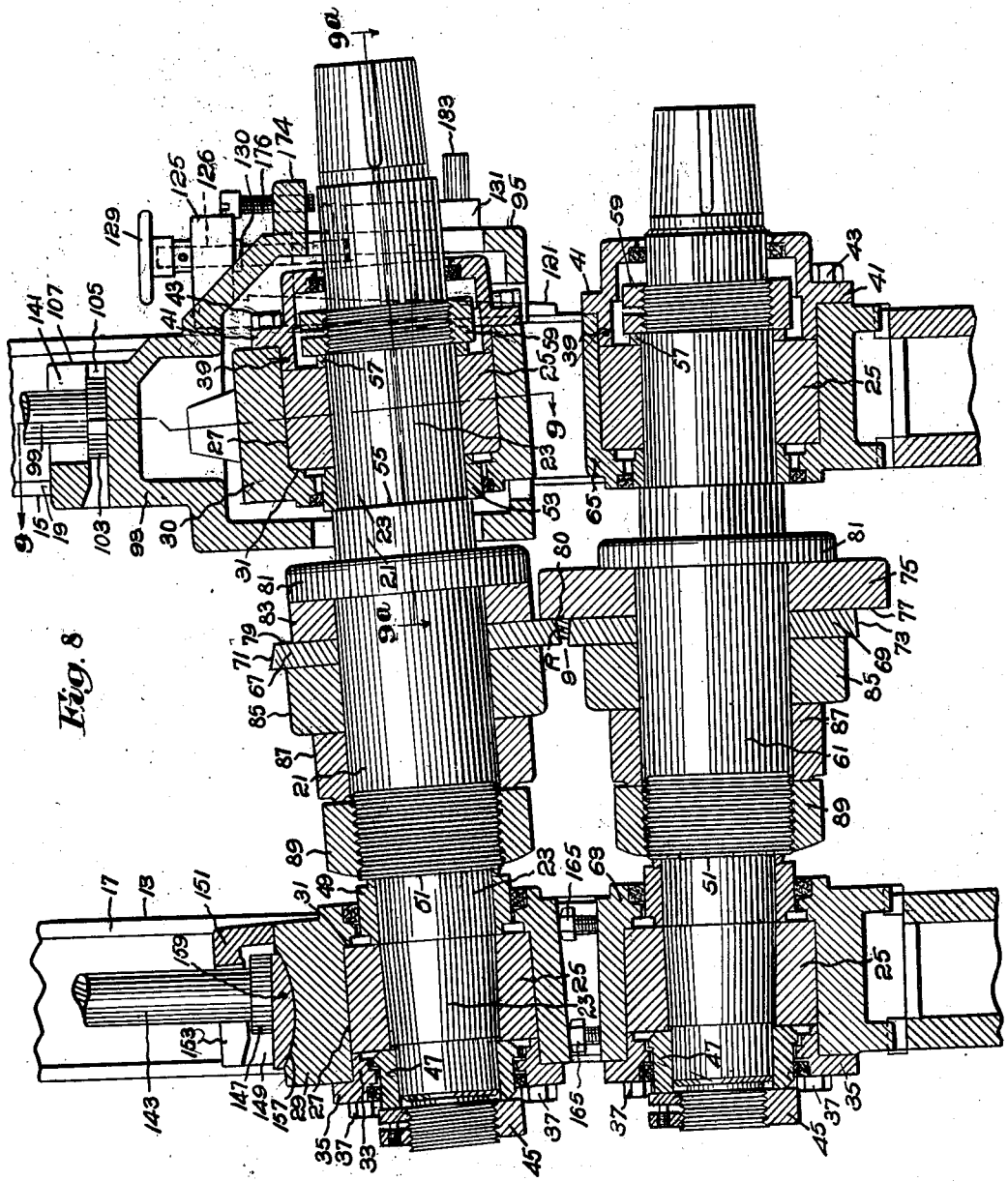

Oct. 17, 1950   L. G. GLESMANN   2,526,475
APPARATUS FOR ROLLING WEDGE SECTIONS
Filed March 29, 1945   9 Sheets-Sheet 5
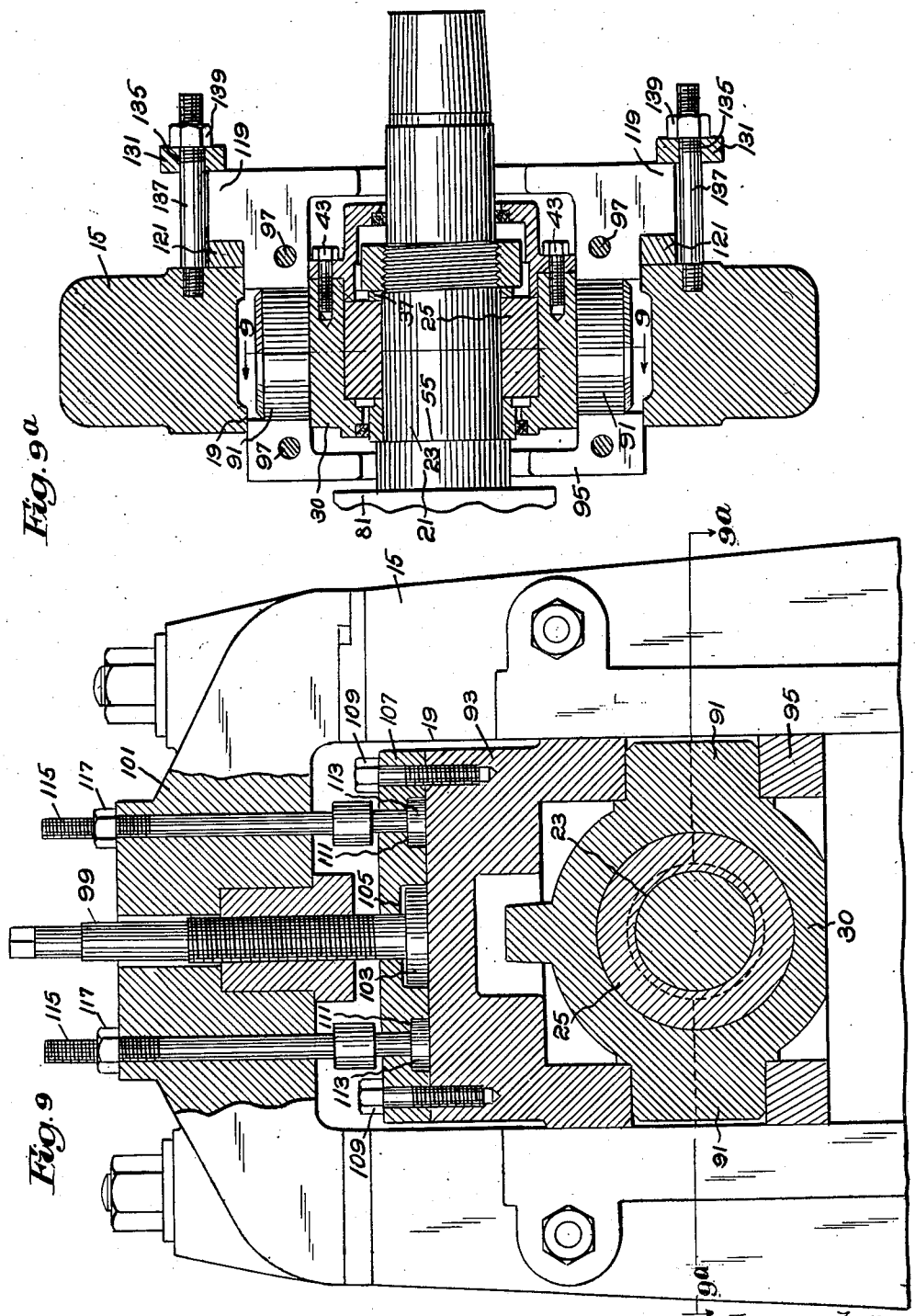
Inventor
Louis G. Glesmann
by Emery, Booth, Townsend, Miller & Welduer Attys.

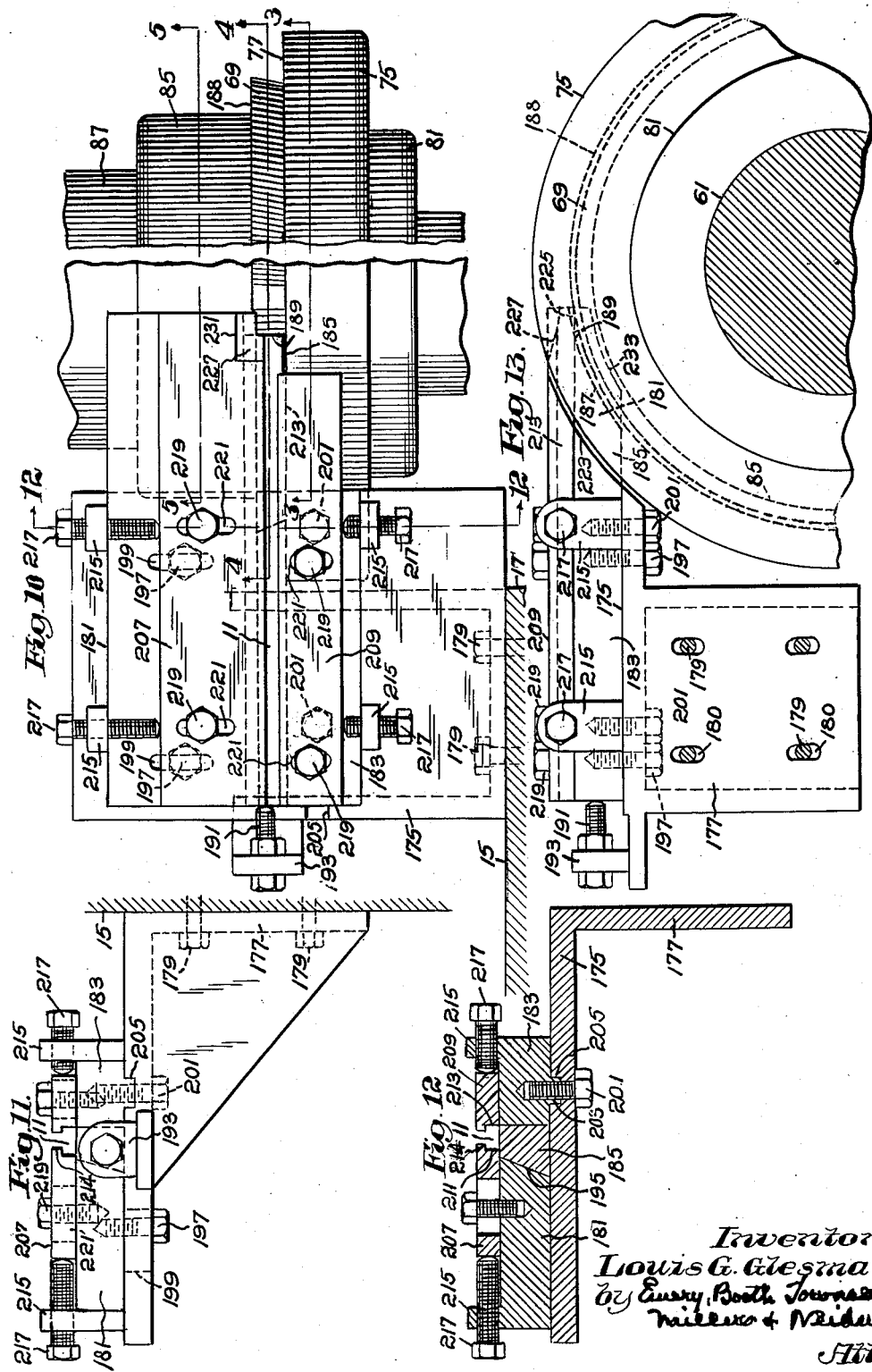

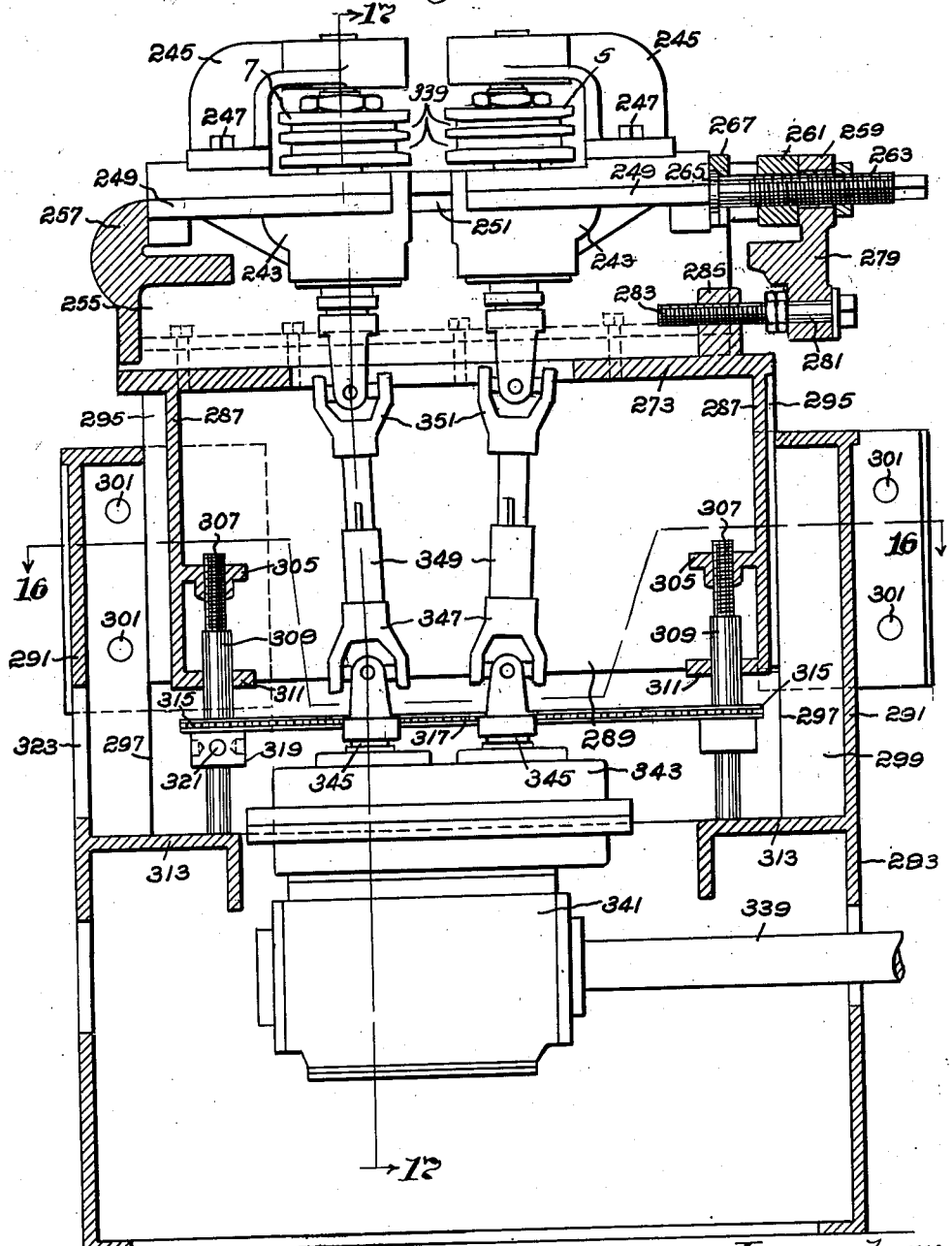

Oct. 17, 1950 L. G. GLESMANN 2,526,475
APPARATUS FOR ROLLING WEDGE SECTIONS
Filed March 29, 1945 9 Sheets-Sheet 8
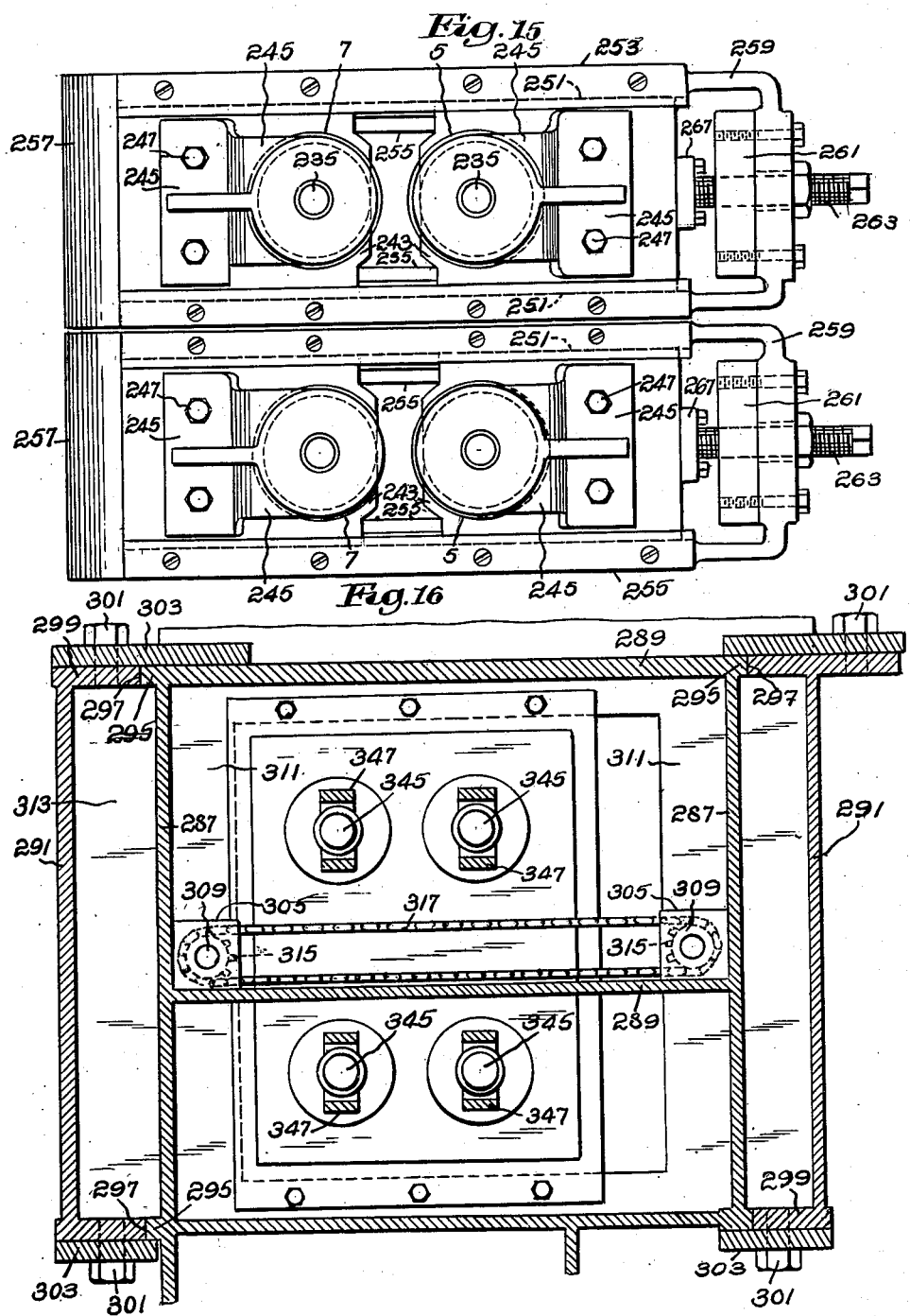

Oct. 17, 1950 L. G. GLESMANN 2,526,475
APPARATUS FOR ROLLING WEDGE SECTIONS
Filed March 29, 1945 9 Sheets-Sheet 9
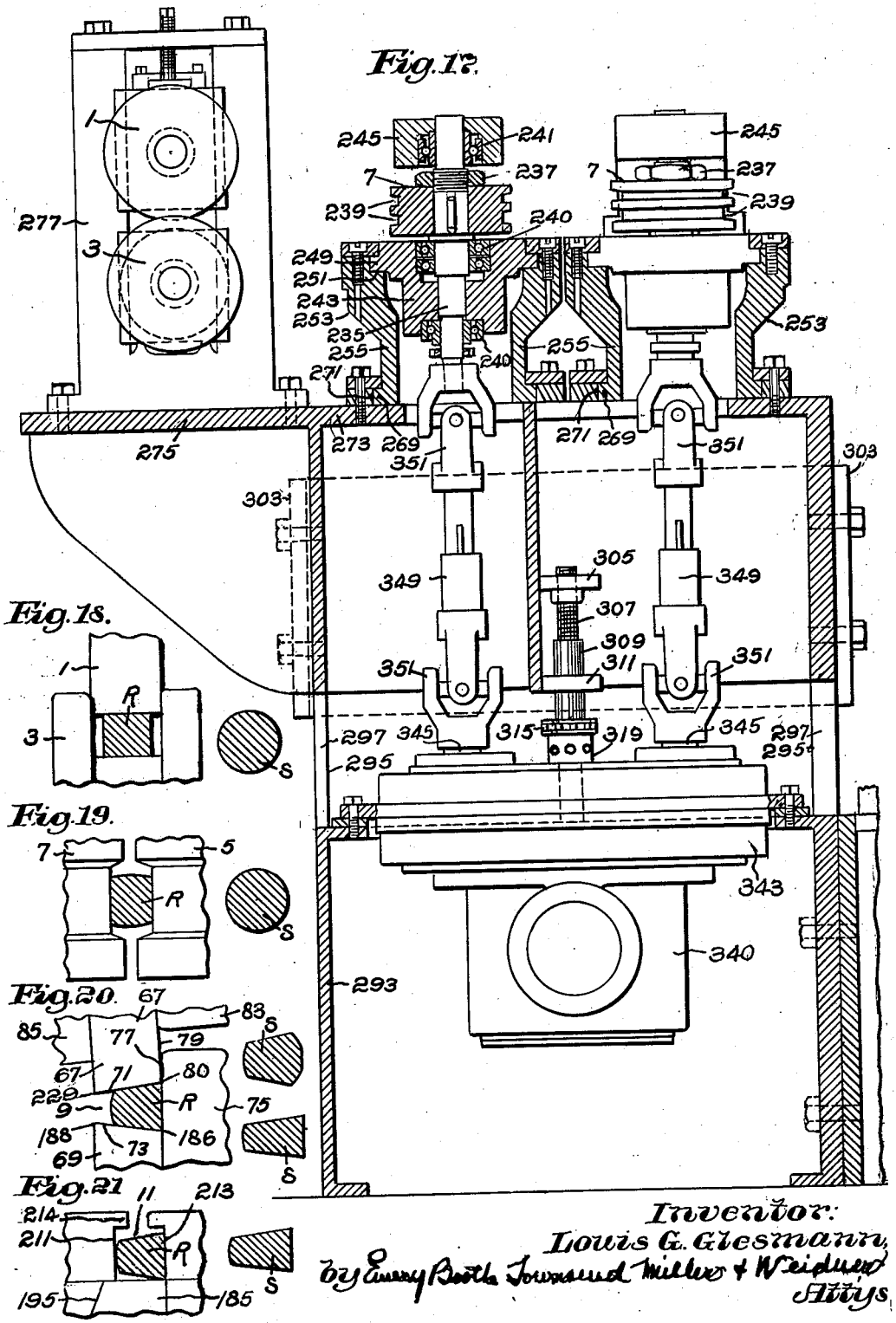
Inventor:
Louis G. Glesmann,
by Emery Booth Townsend Miller & Weidner
Attys Patented Oct. 17, 1950

2,526,475

UNITED STATES PATENT OFFICE 2,526,475

APPARATUS FOR ROLLING WEDGE
SECTIONS

Louis G. Glesmann, Rome, N. Y., assignor to
Revere Copper and Brass Incorporated, Rome,
N. Y., a corporation of Maryland Application March 29, 1945, Serial No. 585,457

2 Claims. (Cl. 80—56)

My invention relates to apparatus for rolling so-called "wedge sections," for example, commutator bar stock.

The invention, which has among its objects the provision of an improved mill and associated apparatus for shaping wedge sections, will be best understood from the following description when read in the light of the accompanying drawings, the scope of which invention will be more particularly pointed out in the appended claims.

In the drawings:

Fig. 2 is an elevation, on an enlarged scale, of the main mill of the apparatus according to Fig. 1;

Figure 1:
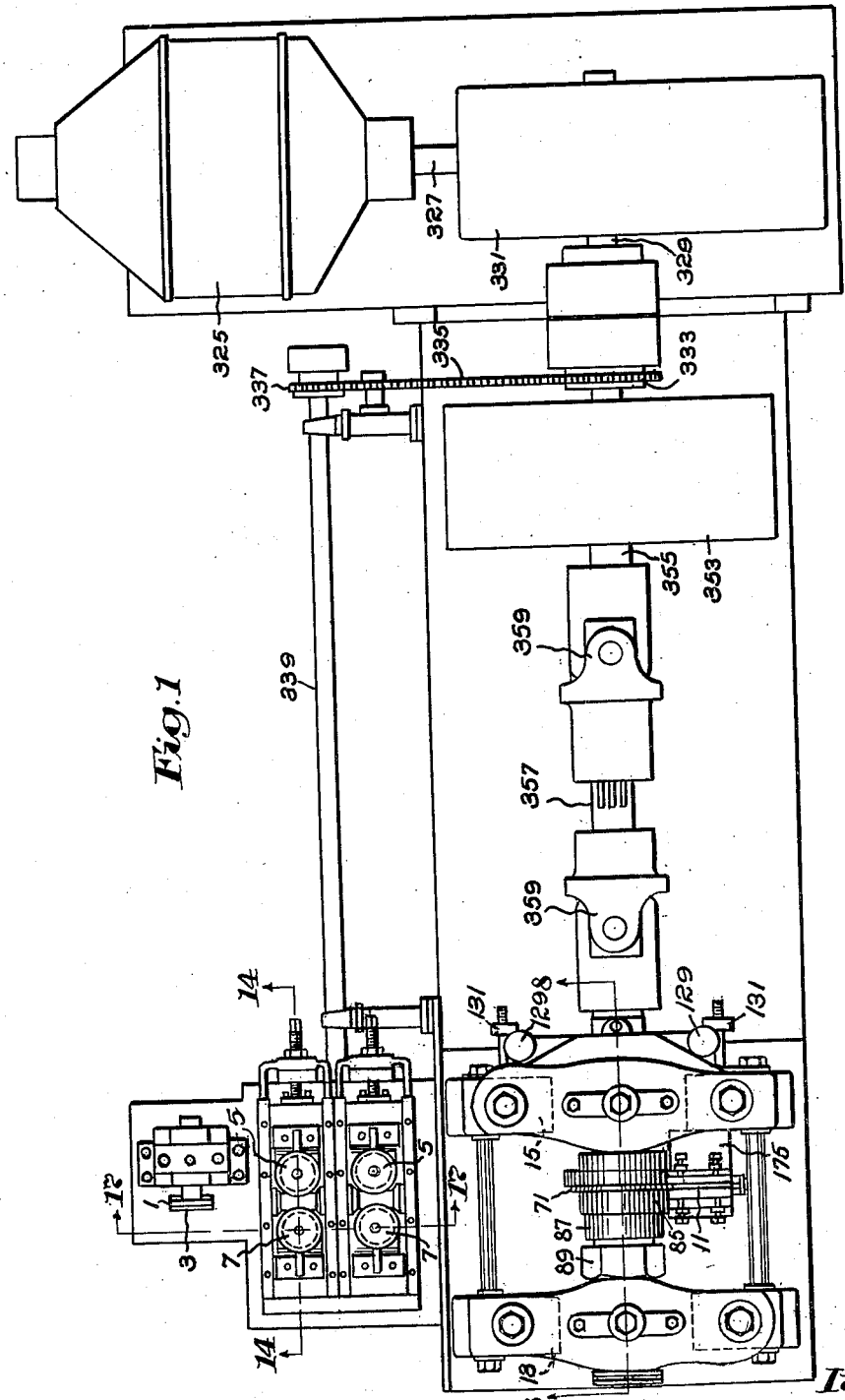
Fig. 1 is a plan of apparatus according to the invention.

Figs. 3, 4 and 5 are sections on the lines 3—3, 4—4 and 5—5 of Fig. 10;

Fig. 6 is an elevation of the main mill as viewed from the left in Fig. 2;

Fig. 7 is an elevation of the main mill as viewed from the right in Fig. 2;

Fig. 8 is a fragmentary section, on an enlarged scale, on the lines 8—8 of Figs. 1 and 7 with the upper roll adjusted into a different angular position;

Fig. 9 is a section on the lines 9—9 of Figs. 8 and 9a;

Fig. 9a is a section on the lines 9a—9a of Figs. 7, 8 and 9;

Fig. 10 is a plan, on an enlarged scale, of the rod straightener and guide, together with the associated lower roll of the main mill, with parts broken away;

Fig. 11 is an end elevation of the rod straightener and guide as viewed from the left in Fig. 10;

Fig. 12 is a section on the line 12—12 of Fig. 10;

Fig. 13 is a side elevation of the parts shown by Fig. 10;

Fig. 14 is a section through the edge mill on the line 14—14 of Fig. 1, with parts in elevation;

Fig. 15 is a plan, with parts omitted, of the edge mill according to Fig. 14;

Fig. 16 is a section on the line 16—16 of Fig. 14;

Fig. 17 is a section on the line 17—17 of Figs. 1 and 14; and

Figs. 18, 19, 20 and 21 are more or less schematic views showing the bar being operated upon as it passes through, respectively, the pinch rolls of the uncoiler, edge mill, main mill, and straightening device.

As diagrammatically illustrated in Figs. 19 to 21, in the submitted embodiment of the invention the copper rod R operated upon passes from an uncoiler comprising the upper and lower box rolls 1 and 3, which latter serve as pinch rolls to guide the rod to the pass opening formed by the grooved rolls 5 and 7 of an edge mill. It then passes through the wedge-shaped pass opening 9 formed by the upper and lower rolls of the main mill, and finally through the guide slot 11 of a rod straightening device.

The rolls 1 and 3 of the uncoiler serve to guide the rod R to the edge mill without altering the cross-section of said rod. The edge mill serves to reduce the thickness of the rod horizontally, as viewed in Fig. 19, without materially elongating the rod, this horizontal reduction being accompanied by approximately a corresponding increase in the vertical dimension of the rod as viewed in Fig. 19. The main mill, because the pass opening 9 thereof is tapered horizontally as viewed in Fig. 20, serves to form the rod to a wedge-shaped cross-section. Because of the wedge shape of the pass opening of the main mill, the rod passing through it is in effect rolled both longitudinally and transversely in horizontal directions, which elongates the rod longitudinally, and, as viewed in Fig. 20, elongates it transversely in a horizontal direction. Consequently, the rod is given such reduction in the edge mill as will compensate for this transverse elongation of the rod in the main mill, so as to cause the distance between the wider and narrower edges of the rod as it leaves the main mill to be spaced apart the desired distance.

As there is a greater reduction of the rod in the main mill at the narrower edge portion of the rod than at its wider edge portion, the rod leaving the main mill would, if means were not provided to prevent it, be curved edgewise on a relatively small radius toward its wider edge. However, the rod in passing through the elongated slot 11 of the rod straightener is caused, by its engagement with the opposite vertical walls of said slot, as viewed in Fig. 21, to be discharged from said slot approximately straight.

As the rod passes through the pass opening 9 of the main mill the action of the rolls on the rod tends to force it laterally against the wider edge of said pass opening, which causes the wider edge of the rod to be flat and to have sharp corners where it intersects the faces of the rod. As shown in Fig. 20, the rod does not entirely fill the pass opening 9, so that there is no binding action of the rolls on the opposite edges of the rod, as would be the case were the pass opening closed at each edge and the rod permitted to expand to contact with each of those edges. It will be understood that it is impossible beforehand to predict with accuracy the exact distance between the wider and narrower edges of a rod made of a given batch of metal as it leaves the main mill, because of the reduction caused by that mill resulting in both a transverse and a longitudinal increase in the dimensions of the rod, the relative extents of which may vary depending upon the exact condition of the metal of the rod. Consequently, the distance between these edges is determined for a given batch of rods by trial adjustment of the distance between the rolls of the edge mill.

Preferably the rod selected to be operated upon is of rectangular cross-section, and in fact necessarily so where the wedge section is rather thin as measured between its faces as compared to the distance between its narrower and wider edges. However, when forming wedge sections in which the rod is rather thick in this respect, it is entirely feasible to start with a rod of round cross-section, such as the rod R shown at the right hand side of Fig. 18. Ordinarily, it will be necessary to make two passes of the round rod through the apparatus, the first pass through the main mill reducing the rod to say the cross-section shown at the upper right hand side of Fig. 20 and the second pass reducing it to its final shape shown at the lower left hand side of that figure, the rod during each pass moving through the slot 11, the width of which slot is so adjusted in each instance as to cause the opposite edges of the rod to contact with the opposite vertical sides of the slot. During the first pass of the round rod the rolls of the edge mill may be spaced such distance apart as to serve merely as a guide for the rod, but during the second pass may be spaced apart the necessary distance to reduce the rod the same as when a rod of rectangular cross-section is selected.

Referring particularly to Figs. 1, 2, and 6 to 9a, the main mill comprises the spaced standards 13 and 15, respectively formed with windows 17 and 19 for receiving the chocks of the upper and lower rolls of the stand of rolls comprised by said mill.

As best illustrated in Fig. 8, the upper roll arbor 21 of the main mill has at each end a reduced diameter portion 23 which is rotatably received in an adjacent bearing block 25, these bearing blocks being removably received in the bores 27 of the associated chocks 29 and 30. As shown, each bore 27 adjacent its inner end is formed with an annular internal shoulder 31, with which the associated bearing block 25 abuts. Abutting with the outer end of the bearing block for the left hand end of the arbor 21, as viewed in Fig. 8, is a removable sleeve 33 received by the bore 27, this sleeve at the outer side of the chock having a flange 35 removably secured thereto by the bolts 37. Abutting with the outer end of the bearing block for the right hand end of the arbor 21, as viewed in Fig. 8, is a removable sleeve 39 received by the bore 27 of the associated chock, this sleeve having a flange 41 removably secured to the chock by the bolts 43. In this way each bearing block is normally clamped in its associated chock against rotation and axial movement relative thereto.

As shown, screw-threaded on the left hand end of the upper arbor 21, as viewed in Fig. 8, is a lock nut 45 which bears against the outer end of a sleeve 47 slipped over the extreme end portion of the arbor, the inner end of the sleeve bearing against the bearing block 25. At the other side of the bearing block 25 is a sleeve 49 slipped over the arbor, this sleeve bearing at one end against the annular shoulder portion 51 of the arbor and at its opposite end against the bearing block. Hence, when the nut 45 is screwed up, the arbor cannot move axially relative to the bearing block, which latter, as above explained, cannot move axially of the arbor relative to the chock.

Similarly, at the right hand end of the arbor 21, as viewed in Fig. 8, there is slipped on the arbor a sleeve 53 which at one end abuts with the annular shoulder 55 on the arbor and at its other end with the adjacent bearing block 25. At the opposite side of the bearing block is slipped over the arbor a ring or sleeve 57 which at one end bears against the bearing block and at its other end against a lock nut 59 screw-threaded on the arbor. This construction, like the construction at the opposite end of the arbor, prevents the latter from moving axially relative to the bearing block, which latter, as above explained, cannot move axially of the arbor relative to its associated chock.

The arbor 61 of the lower roll of the main mill, as clearly illustrated in Fig. 8, is rotatably mounted in its associated chocks 63 and 65 in identically the same way as that in which the arbor 21 of the upper roll is mounted in the chocks 29 and 30 respectively. Hence the arbor 61, like the arbor 21, normally cannot move axially relative to its bearing blocks 25 and the latter cannot move axially of the arbor relative to their associated chocks.

As best shown in Fig. 8, the pass opening 9 of the main mill is formed by the two hardened steel disks 67 and 69 respectively carried by the upper arbor 21 and lower arbor 61. As shown, the upper disk has the tapered or beveled peripheral surface 71, and the lower disk the oppositely tapered or beveled peripheral surface 73. Abutting with the smaller diameter side of the disk 69 is a disk 75 having a flat surface 77 extending radially outward from the peripheral surface 73. The disk 67 has a flat inwardly radially extending surface 79, which latter, or the corner 80 between it and the surface 71, is adapted to be adjusted into contact with the radially outwardly extending surface 77 of the disk 75 so as to close the upper corner of the wider edge of the pass opening.

As shown, the upper arbor 21 is integrally formed with a collar or flange 81 between which and the disk 67 is positioned a removable spacer 83. At the opposite side of the disk 67 are positioned removable spacers 85 and 87, with which latter abuts one side of a clamping nut 89 removably screw-threaded on the arbor for clamping the parts against the collar 81. Likewise, the lower arbor 61 is integrally provided with a like collar 81, and with spacers 85 and 87 and a nut 89 for removably clamping the parts against said collar.

The transverse width of the window 17 of the standard 13 is such that the roll parts carried by the arbors 21 and 61 can be removed through said window upon removal of the nuts 89 from the arbors after the chocks 29 and 63 are removed from said window, it being understood that it is frequently necessary to replace or substitute the disks 67 and 69 for forming wedge sections of different size and shape.

As illustrated (see Figs. 7, 8, 9 and 9a), the chock 30 for the right hand end of the upper arbor 21, as viewed in Fig. 8, is provided at each of opposite sides thereof with a horizontally extending trunnion 91. These trunnions are pivotally mounted in a block comprising the upper part 93 and lower part 95, which parts are secured to each other by the removable bolts 97 (Figs. 7 and 9a).

The block formed by the connected together parts 93 and 95 is mounted in the window 19 of the standard 15 for vertical and horizontal adjustment. This vertical adjustment is effected by means of the screw 99 screw-threadedly extending through the upper cross member 101 (Fig. 9) of the standard 15. As shown, the screw 99 at its lower end has a head 103 rotatably received in a slot 105 formed on the underably side of a plate 107, which plate is secured to the upper side of the part 93 by the bolts 109. The slot 105 extends transversely across the plate, as is clearly shown in Fig. 8, so that the block formed by the connected parts 93 and 95 may be readily assembled with the screw 99 when the block is inserted in the window 19 of the adjacent standard. In spaced relation to the slot 105 and at each side thereof the plate 107 is formed on its under side with a slot 111 (Fig. 9) which, like the slot 105, extends across the plate. In these slots 111 are received the heads 113 of bolts 115, which latter loosely extend through the upper cross member 101 of the standard and at the upper side of said member are provided with nuts 117. By turning the screw 99 the block formed by the connected together parts 93 and 95 may be raised or lowered to adjust the block into its desired vertical position, after which the nuts 117 may be tightened to draw the bolts 115 upwardly so as to clamp the upper surface of the part 93 against the lower surface of the head 103 of the screw.

Referring to Figs. 2, 7, 8 and 9a, the block formed by the parts 93 and 95, in which block the chock 30 for the right hand end of the upper arbor 21 is journaled, is provided at each of opposite sides thereof with a projection 119 extending over the outer side of the standard 15. Between each of these projections and the adjacent surface of the standard is positioned a wedge 121, the wedge having a tapered face 123 (Fig. 2) bearing against a complementary tapered face formed on the adjacent projection 119, and also having an opposite flat face bearing against the adjacent side of the standard. As shown, each wedge at its upper end is provided with a projection 125 through which rotatably extends the shank 126 (Fig. 8) of a screw 127 (Fig. 2), the body of the latter being screw-threadedly received in the adjacent projection 119. As shown, the shank of the screw fixedly carries at its upper end a head 129 (Fig. 8) bearing against the upper side of the projection 125 of the wedge, and, at the under side of this projection, is formed with a collar 130 bearing against the under side of said projection. Hence, by turning the screw by means of its head 129 the wedge may be moved vertically for adjusting the block formed by the connected together parts 93 and 95 to the right or left as viewed in Fig. 8, thereby to adjust the arbor 21 axially. For clamping this block in its longitudinally adjusted positions are provided clamps 131 (Figs. 2, 7 and 9a), which clamps bear against the outer side of the adjacent projection 119. These clamps are slidably mounted on spaced guide pins 133 fixedly carried by the adjacent standard. Extending through an opening 135 (Fig. 9a) formed in each of these clamps between these pins is a stud 137 screw-threaded at one end into the adjacent standard, each stud at its outer end carrying a nut 139 for forcing the clamp 131 against the projection 119 for pressing the latter against the wedge and the wedge against the standard so as to lock the parts in position. For permitting the block formed by the parts 93 and 95 to move when adjusted by the wedges, the plate 107 which connects the adjusting screw 99 to those parts is formed with a transverse slot 141 (Fig. 8) communicating with the slot 105 therein, through which slot 141 slidably extends the body portion of said screw.

The chock 29 for the left hand end of the upper roll arbor 21 is slidably mounted in the window 17 of the adjacent standard 13 so that it may move vertically, may move axially of the arbor, and may swivel in a vertical plane which includes the axis of the arbor. For raising and lowering this chock vertically is provided a screw 143 (Figs. 2 and 8), the screw screw-threadedly extending through the upper cross member 145 of the standard, and, at its lower end, being provided with a head 147. The head is rotatably received in a slot 149 (Fig. 8) formed on the under side of a plate 151 and extending transversely of that plate. Communicating with the slot 149 the plate is formed with a transversely extending slot 153 through which extends the body portion of the screw 143. The plate is removably secured to the chock 29 by the bolts 155 (Fig. 6). As illustrated, the upper surface of the chock 29 is formed with a depression, the bottom surface 157 (Fig. 8) of which is an element of the surface of a sphere. In this depression is received a plate 159 having a lower surface complementary to the surface 157, and having an upper flat surface against which the under side of the head 147 rests. This construction permits the chock 29 readily to be raised and lowered by means of the screw 143, and permits the chock 29 to be moved axially of the arbor 21 when the wedges 121 are adjusted, and the chock 29 to swivel in the window 17 when said chock and the chock 30 are raised or lowered relative to each other.

The chock 63 for the left hand end of the lower roll arbor 61 is slidably mounted in the associated window 17 for vertical movement and movement axially of said arbor. At its lower end this chock is shown as provided with projections 161 (Fig. 6) resting upon lugs 163 formed as an integral part of the sill of the window 17. Screw-threaded into the upper surface of the chock 63 are the stud bolts 165, the heads of which bolts are adapted to be screwed into contact with the lower surface of the chock 29 so as to force the latter upwardly against the head 147 of the adjusting screw 143, and force the chock 63 downwardly against the lugs 163. In this way the bolts 165 are adapted to clamp the two chocks 29 and 63 against vibration when the upper chock 29 has been adjusted into its proper vertical and angular positions.

As illustrated, the chock 65 for the right hand end of the lower roll arbor 61, as viewed in Fig. 8, is provided at each of opposite sides thereof with a laterally extending ear 167 (Fig. 7), which ear overlies the adjacent side of the standard 15. Each of these ears at its lower edge is formed with a notch 169 (Fig. 7) for receiving a stud bolt 171 carried by and projecting from the standard, on the end of which bolt is screw-threaded a nut 173 for clamping the ear against the standard. When the ears are so clamped the chock 65 is held against movement relative to the standard 15, which holds the chock 63 at the opposite end of the arbor against movement axially of the latter relative to the standard 13.

It will be observed from Fig. 8 that the angle between the peripheral surfaces 71 and 73 of the disks 67 and 69 may be varied by tilting the upper roll arbor 21 in a vertical plane. This may be done by raising or lowering the upper chocks 29 and 30 relative to each other by means of the adjusting screws 99 and 143, the mounting of the chock 30 on the trunnions 91 and the slidable mounting of the chock 30 in the window 17 permitting such tilting. It will be observed from Fig. 8 that when the upper roll arbor 21 is tilted that arbor must be moved axially to maintain the corner 80 between the surfaces 71 and 79 of the upper disk 67 in contact with the surface 77 of the lower disk 75. Such axial adjustment may be effected by use of the wedges 121 in the way hereinbefore described.

When the disk 67 and associated spacers are to be removed from the upper roll arbor 21 the same may be effected by removal of the nut 45 from the arbor, and removal of the bolts 155 securing the plate 151 to the chock 29. Removal of these parts permits the chock 29 to be slipped off the arbor and removed from the window 17. After such removal of the chock, the nut 89 may be removed from the arbor, removal of the nut permitting the disk and spacers to be slipped off the arbor through the window 17. It will be observed that when the chock 29 is so removed the left hand end of the arbor 21, as viewed in Fig. 8, is unsupported and would, if nothing were provided to prevent it, swing downwardly by reason of the trunnion support of the chock 30 at the opposite end of the arbor. To prevent such downward swinging of the arbor under these conditions, the part 93 is integrally provided with a projection 174 (Figs. 7 and 8) through which screw-threadedly extends a screw 176, the lower end of which screw is adapted to abut against the arbor 21. By screwing the screw 176 downwardly to cause it to abut with the arbor, preliminary to removing the chock 29, the arbor is effectively prevented from swinging downwardly about its trunnion support during removal and replacement of the disk and spacers carried by the arbor.

The guide and straightening means for the rod leaving the pass opening 9 of the main mill is best illustrated by Figs. 1 to 5 and 10 to 13. This means comprises the bracket 175 having a depending leg 177 secured by bolts 179 to the inner side of the standard 15, which bolts extend through the vertically extending slots 180 in the leg 177 so that the bracket may be adjusted vertically relative to the rolls of the main mill, and may be clamped in its adjusted position by the bolts.

As shown, mounted on the upper side of the bracket 175 is a pair of bars 181 and 183 between which is positioned a bar 185, the upper surface of which latter forms the lower surface of the guide slot 11 for the bar. The bracket is preferably so positioned that the upper surface of the bar 185 is in the same horizontal plane as the corner 186 (Fig. 20) of the pass opening 9 between the rolls of the main mill. The bar 185 has one of its ends positioned adjacent the disks 67 and 69 of the main mill, the portion of the bar adjacent that end being cut away on its under side as indicated at 187 (Figs. 4 and 13) to just clear the large diameter edge 188 (Fig. 10) of the lower disk 69, so that the extreme end portion of the upper surface of the bar forms a "pick up" edge 189 for the rod R leaving the pass opening 9 between the disks 67 and 69. To accommodate different diameter disks 67 and 69, the bar 185 may be adjusted longitudinally relative to the bracket 175 by means of the adjusting screw 191, which screw screw-threadedly extends through the ear 193 integrally carried by the bracket. The bar 185 may be clamped in its adjusted positions by means of the bar 181, the latter at one edge thereof being beveled as indicated at 195 and the bar 185 being complementarily beveled, as shown in Fig. 12. When the bolts 197, which are tapped into the bar 181 and extend through the slots 199 in the bracket, are tightened said bar by reason of the wedge action exerted by the beveled edge 195 will clamp the bar 185 edgewise against the bar 183. The bar 183 is securely fixed to the bracket by the bolts 201. For securing greater rigidity the bar 183 on its under side is shown as formed with a downwardly projecting rib 203 which is received in a slot 205 formed on the upper side of the bracket.

Resting upon the bars 181, 183 and 185 are shown a pair of transversely spacer bars 207 and 209. The adjacent edges of these two last mentioned bars are recessed to form the edge surfaces 211 and 213, respectively, and the overhanging portions 214, these edge portions together with the overhanging portions forming the slot 11. The width of the slot may be varied by adjusting the bars 207 and 209 toward or away from each other. For effecting this adjustment the bars 181 and 183 at their edges remote from the slot are integrally formed with ears 215 through which screw-threadedly extend the adjusting screws 217, the latter bearing against the adjacent edges of the bars 207 and 209. The bars 207 and 209 may be clamped in their adjusted positions by means of the clamping screws 219 tapped into the bars 181 and 183 and extend through transversely extending slots 221 in the bars 207 and 209.

At one of their ends the superimposed bars 183 and 209 are adjacent edge of the bracket 175 terminate adjacent the disk 75 of the lower roll of the main mill, being cut out at such ends as indicated at 223 (Figs. 3 and 13) to clear the periphery of that disk. The bar 209 is so adjusted that the vertical guide surface 213 thereof is in alignment with the radially extending surface 77 of the disk 75, so that the wider edge of the bar R leaving the pass opening of the main mill will be guided by said radially extending surface to such aligned surface.

The bar 207 of the straightening device at one end is cut out on its under side as indicated at 225 (Figs. 4 and 13) to just clear the large diameter edge 188 (Figs. 4, 10 and 20) of the lower disk 69, and, on its upper side, is cut out to form a notch 227 (Fig. 10) to just clear the large diameter edge 229 (Figs. 4 and 20) of the upper disk 67, the vertical guide surface 211 of the bar 207 thus extending into proximity with the pass opening 9. The width of the notch 227 transversely of the bar 207 is such that the edge 231 (Fig. 10) of the notch is spaced from the edge 229 of the upper disk 67 so that the bar 207 may be adjusted toward the bar 209 to accommodate bars R of different widths between their wider and narrower edges.

As shown (Figs. 5 and 13), the bar 181 is cut out at 233 to clear the spacer 85 of the lower roll of the main mill.

As best shown by Figs. 1, 14, 15, 16 and 17, two sets of cooperating edge rolls 5 and 7 are provided so that the rod R will be operated upon in two successive passes. As shown, these rolls are mounted on spindles 235 (Fig. 17), being splined to the spindles and removably secured thereto by nuts 237 screw-threaded on the spindles. Each roll, as shown, is provided with a pair of grooves 239 of different widths so as to accommodate different sizes of rods R to be operated upon.

As shown, each spindle 235 is rotatably mounted in bearings 240 and 241, the lower bearings 240 being directly supported by a carriage 243, while the upper bearing 241 is supported in a bracket 245 removably secured to the carriage by bolts 247. Upon removal of the brackets, the nuts 237 may be removed from the spindles to permit rolls of different sizes in respect to their grooves to be substituted.

As shown, each carriage 243 is provided at each of opposite sides thereof with a longitudinally extending rib 249 slidably mounted in a way 251 at the upper portion of a support 253. Two such supports are provided, each slidably carrying a pair of carriages 243, one carriage for one of the rolls 5 and the other for one of the opposed rolls 7.

As shown, each support 253 comprises the longitudinally extending side members 255 which are integrally connected at one end by a transverse end member 257 (Fig. 14), against the upper portion of which latter the adjacent carriage 243 for the roll 7 is adapted to abut. At the ends of the side members opposite the transverse end member 257 the side members carry a yoke 259 extending from one side member to the other. At the intermediate portion of the yoke is removably secured a block 261 provided with a screw-threaded opening through which screw-threadedly extends an adjusting screw 263 for the adjacent carriage 243. As shown, the screw is provided with a head 265 (Fig. 14), which head is rotatably secured to said carriage by a slotted plate 267, the construction being like that heretofore described for securing the adjusting screw 143 (Figs. 6 and 8) to the chock 29 of the main mill. By turning the screw 263 the adjacent roll 5 may be adjusted toward or away from its opposed roll 7 so as to vary the distance between those rolls. When the bar R passes between the rolls the carriages 243 for the rolls 7 will be held against the transverse end member 257 of the support 253, while the carriages 243 for the rolls 5 will be held against movement by the screws 263.

As shown, the side members 255 of each support 253 are provided at their lower edges with outwardly projecting longitudinally extending ribs 269 (Fig. 17) which are slidably received in ways 271 formed on the upper surface of a platform 273, this platform having a laterally extending portion 275 which carries the frame 277 of the pinch rolls 1 and 3. As shown, each yoke 259 is integrally formed with a depending portion 279 (Fig. 14) which is perforated and rotatably receives in such perforation the shank 281 of an adjusting screw 283, the shank 281 being held against axial movement relative to the portion 279, and the body of the screw screw-threadedly extending through an upwardly projecting ear 285 formed integrally with the platform 273. By this construction when the screw 283 is turned the associated support 253 may be moved in the direction of the axis of the lower roll of the main mill so as to move as a unit the pair of cooperating rolls 5 and 7 in such direction as to align the opening between the rolls 5 and 7 with the pass opening 9 between the rolls of the main mill.

As illustrated, the platform 273 is formed with a box-like downwardly projecting portion having the lateral walls 287 and 289 which are slidably mounted in the stationary standards 291 extending vertically upward from opposite sides of a base portion 293. As shown, the lateral walls 289 have at each vertical edge thereof a projecting portion 295, the vertical edge of which latter bears against the vertical edge 297 of the adjacent web 299 of the channel-shaped standard 291. On the outer sides of the webs are secured, by bolts 301, vertically extending plates 303 which project over the lateral walls 289 of the depending portion of the platform 273. By this construction the platform is slidably mounted for vertical movement in the standards 291 so that the rolls 5 and 7 may be raised and lowered to align either of their grooves vertically with the pass opening 9 of the main mill.

For effecting the vertical adjustment of the rolls 5 and 7, the lateral walls 287 of the depending portion of the platform 273 are provided with ears 305 through which screw-threadedly extend the screw-threaded end portions 307 of posts, the body portions 309 of which posts are rotatably received in openings formed in flanges 311 positioned below the ears 305 and formed integrally with the lateral walls 287 and 289. At their lower ends these posts rotatably rest upon flanges 313 carried by the base portion 293 of the support for the channel-shaped standards 291. As shown, the intermediate portion 309 of each post fixedly carries a sprocket wheel 315, about which two sprocket wheels passes a chain 317. As shown, the hub 319 of one of the sprocket wheels 315 is provided with spaced depressions 321 adapting it to be engaged and rotated by a sprocket wrench inserted through the adjacent opening 323 in one of the channel-shaped standards 291. By this construction both posts will be rotated simultaneously in the same direction for raising or lowering the platform 273.

For driving the main mill and edge rolls, in the embodiment of the invention illustrated an electric motor 325 (Fig. 1) is provided. The shaft 327 of this motor drives a shaft 329 through a reduction gear, the casing of which latter is shown at 331. Operatively carried by the shaft 329 is a sprocket wheel 333, which latter through the chain 335 and sprocket wheel 337 drives a shaft 339 carrying the last mentioned sprocket wheel. The shaft 339 through suitable gearing of a known kind, contained in the casings 341 and 343 (Figs. 14 and 17), drives the four shafts 345, which latter are severally connected by means of the universal joints 347 to longitudinally extensible shafts 349, the shafts 349 being severally connected at their upper ends by universal joints 351 to the several spindles 235 of the edge rolls 5 and 7.

Referring to Figs. 1 and 2, the shaft 329 through suitable reduction gearing contained in the casing 353 (Fig. 1) also drives a shaft 355 which is connected through the longitudinally extensible shaft 357 and universal joints 359 to the arbor 21 of the upper roll of the main mill. The gearing in the casing 353 also drives a second shaft 361 (Fig. 2) positioned immediately below the shafts 355 and 357, the shaft 361 being connected to the arbor 61 for the lower roll of the main mill.

It will be understood that within the scope of the appended claims wide deviations may be made from the forms of the invention described without departing from the spirit of the invention.

I claim:

1. A mill for rolling wedge sections, such as commutator bars, having, in combination, a pair of cooperating rolls having axes at an angle to each other and formed with spaced opposed peripheral surfaces defining the faces of a wedge section to be formed by passing a rod lengthwise through said rolls, one roll being formed with a flat surface from which said opposed peripheral surfaces extend outwardly in a converging direction defining the wider edge of such wedge section, which flat surface extends radially outward from the peripheral surface defining one face of said wedge section, the other roll having an oppositely facing radially inwardly extending surface overlapping said flat surface and intersecting the peripheral surface defining the opposite face of said wedge section, such intersection of said surfaces forming on the last mentioned roll a circular corner adapted for tangential contact with said flat surface of the first mentioned roll with the remaining portions of said overlapping radially extending surfaces out of contact, mountings for the rolls, means for adjusting said mountings relatively toward and away from each other for varying the thickness of the wedge section and for varying the angle between the axes of the rolls for varying the angle between the faces of the wedge section, in each instance with concomitant varying of the extent of overlapping of said radially extending surfaces, and means for relatively adjusting the rolls axially in each of opposite directions for permitting the first mentioned adjustments and for placing said circular corner in tangential contact with said flat surface in each position of said first mentioned adjustments.

2. A mill according to claim 1 having spaced housings for the rolls; a part mounted on one of said housings; a bearing for one end of one of said rolls trunnioned on said part for swiveling about an axis transverse to said roll; means for restraining such trunnioned roll against axial movement in both directions relative to said bearing; means for adjusting said part on its associated housing axially of said trunnioned roll, and for adjusting it on said housing in directions normal to the axis of swiveling of said bearing for varying the distance between said rolls; a bearing for the opposite end of said trunnioned roll mounted on the other housing for swiveling movement, and means for adjusting the last mentioned bearing on its associated housing transverse to said trunnioned roll also for varying the distance between said rolls, means for also restraining the trunnioned roll against axial movement relative to its last mentioned bearing, which latter is mounted for sliding in its housing axially of that roll.

LOUIS G. GLESMANN.

REFERENCES CITED

The following references are of record in the file of this patent:

UNITED STATES PATENTS

| Number | Name | Date |
|---|---|---|
| 171,127 | Hardy | Dec. 14, 1875 |
| 177,491 | Fox | May 16, 1876 |
| 219,277 | Lauth | Sept. 2, 1879 |
| 272,082 | Nugent | Feb. 13, 1883 |
| 421,625 | Sims | Feb. 18, 1890 |
| 694,722 | Brooker | Mar. 4, 1902 |
| 796,335 | Johnston | Aug. 1, 1905 |
| 1,354,976 | Jones | Oct. 5, 1920 |
| 2,102,809 | Remmen | Dec. 21, 1937 |
| 2,195,502 | Smitmans | Apr. 2, 1940 |

FOREIGN PATENTS

| Number | Country | Date |
|---|---|---|
| 255,939 | Germany | Dec. 25, 1910 |